Figures 1, 2:
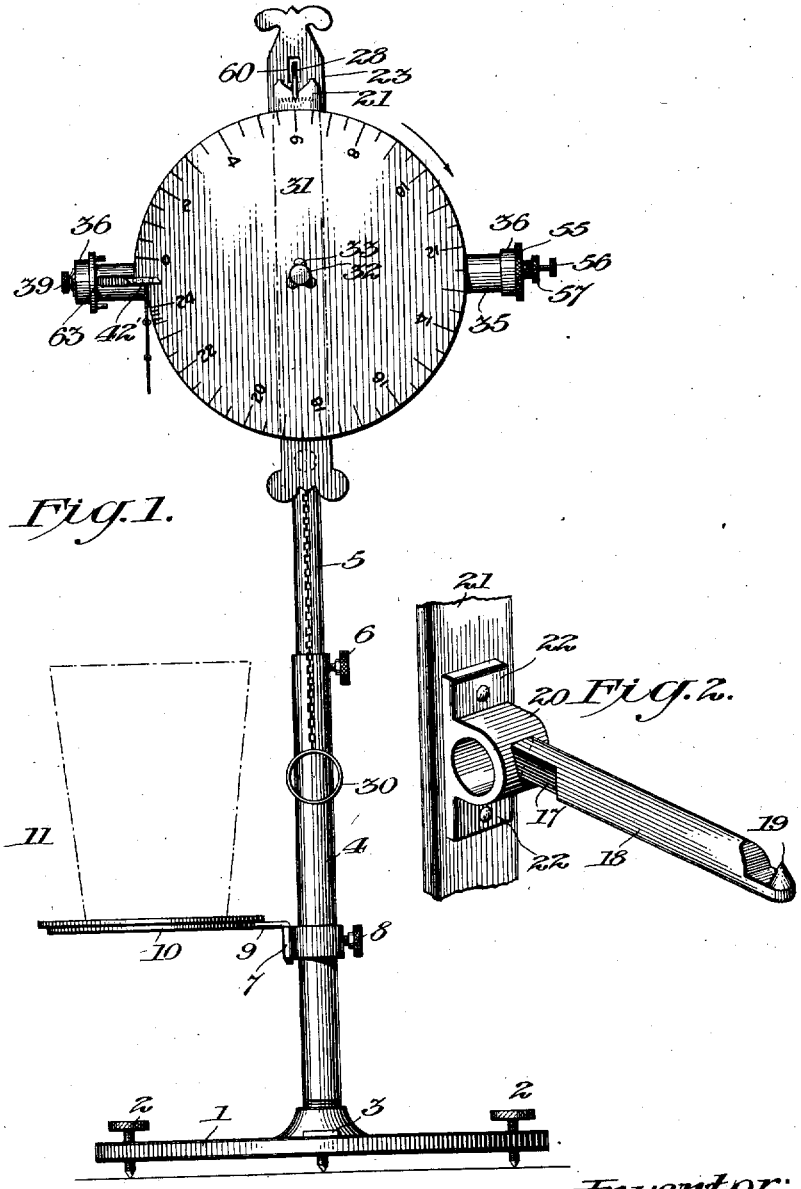

B. R. JOLLY.

APPARATUS FOR DETERMINING SPECIFIC GRAVITY.

APPLICATION FILED DEC. 14, 1911.

Reissued June 9, 1914.

13,745.

3 SHEETS—SHEET 1.

Witnesses:
L. H. Potzler
James H. Marr

Inventor:
Benjamin Rush Jolly,
by Edward E. Clement

COLUMBIA PLANOGRAPH CO., WASHINGTON, D. C.

B. R. JOLLY.

APPARATUS FOR DETERMINING SPECIFIC GRAVITY.

APPLICATION FILED DEC. 14, 1911.

Reissued June 9, 1914.

13,745.

3 SHEETS—SHEET 2.

Witnesses:
L. H. Potzler
James A. Marr

Inventor:
Benjamin Rush Jolly
by Edward E. Clements

COLUMBIA PLANOGRAPH CO., WASHINGTON, D. C.

B. R. JOLLY.

APPARATUS FOR DETERMINING SPECIFIC GRAVITY.

APPLICATION FILED DEC. 14, 1911.

Reissued June 9, 1914.

13,745.

3 SHEETS—SHEET 3.

Witnesses:
L. H. Potzler
James H. Marr

Inventor:
Benjamin Rush Jolly,
by Edward E. Clement

COLUMBIA PLANOGRAPH CO., WASHINGTON, D. C.

UNITED STATES PATENT OFFICE.

BENJAMIN RUSH JOLLY, OF RALEIGH, NORTH CAROLINA.

APPARATUS FOR DETERMINING SPECIFIC GRAVITY.

13,745. Specification of Reissued Letters Patent. Reissued June 9, 1914.

Original No. 945,329, dated January 4, 1910, Serial No. 450,556. Application for reissue filed December 14, 1911. Serial No. 665,872.

*To all whom it may concern:*

Be it known that I, BENJAMIN RUSH JOLLY, a citizen of the United States, and a resident of Raleigh, in the county of Wake and State of North Carolina, have made a certain new and useful Improvement in Apparatus for Determining Specific Gravity, of which the following is a specification.

My invention relates broadly to methods of determining mass or weight, as referred to a preselected standard, and in particular to methods of determining specific gravity, as well as the apparatus employed in practising the same.

It has for its object the direct establishment of a ratio of comparison between a selected standard material, and other materials referred thereto, in one operation, and without the necessity for any intermediate or subsequent calculation; also the provision of simple and highly efficient means for practising the method.

The present invention is primarily intended for the use of jewelers and those who deal in precious metals, and for that reason this description will be couched in terms pertaining to the jewelers' art; but I wish to make it quite clear at the outset that this is done for clearness of definition, and not by any means as a limitation, since the invention is applicable to many arts, and to any material.

Heretofore in order to determine the specific gravity or the degree of fineness of a metal, it has usually been necessary to determine its weight in air, then again and separately to determine its weight when immersed in a liquid such as water, and finally by computation separately made in each case, to determine its specific gravity and the relative proportions of its component materials. Even with a completely worked out set of tables and formulæ such a method is troublesome, and involves a constant possiblity of error even with the exercise of considerable care and dexterity as well as the use of accurate and expensive instruments.

My present invention obviates the necessity for more than ordinary experience and care in the use of weights and measures, and makes it possible to accurately determine the fineness of metals without computation by automatically establishing a reciprocal relation between the ratios determined by the first and second weighings, so as to give a direct indication in terms of any desired units as for example carats. Stated broadly, the invention comprises the following steps: first, determining the mass of the body when suspended in air, and preserving the measure of this mass for the time being unchanged; second, determining the balance as against this primary measure, when the body is suspended in a medium of known density such as water; and third, relating the first and second ratios automatically so that the respective determinations, first by the balancing measure and second by the balancing body, may give a direct reading of the ratio of ratios.

Stated in the same broad terms the mechanism which I shall present herein for practising this method, comprises the following elements: a fulcrum or center of balance, means for referring the net weight only of an article to said fulcrum while varying its position with respect thereto, means for referring an initially counterbalancing force to the fulcrum, so as to produce an initial balance in air, as a basis for comparison, and means for directly indicating the ratio between the initial balancing position of the article when suspended in air, and a subsequent balancing position when suspended in liquid.

More specifically stated, the device comprises a scale-beam, a fulcrum, a movable self-compensating article support, and a variable counterbalance, together with a direct reading indicator.

The method of practising the invention is as follows: The article is first attached to the support and the counterbalance adjusted so as to produce a perfect balance in the air; the article is then immersed in liquid, and the counterbalance remains fixed while the article-support is moved with relation to the fulcrum to again produce a balance. The indicating device is affected differentially by these movements and enables the ratio between them to be read directly in desired units.

In the form hereinafter described, the article-support is provided with a compensating weight which automatically moves toward the fulcrum as the article is moved away from it, and vice versa, so that only the net weight of the article itself is concerned in the balances. The counterbalance weight on the other hand is composed of several members or elements independently movable, which enable an exceedingly accurate and delicate adjustment to be attained. The indicating device is a disk with its periphery formed on an involute curve, and graduated on radial lines. The disk is pivoted with its center at the axis of support so that it will occupy different angular positions for different positions of the article support. The graduations on the disk thus afford means for directly reading the extent of movement of the article-support.

In the accompanying drawings I have illustrated one form of apparatus by which my invention may advantageously be practised, and to which reference is made above.

Figure 3:
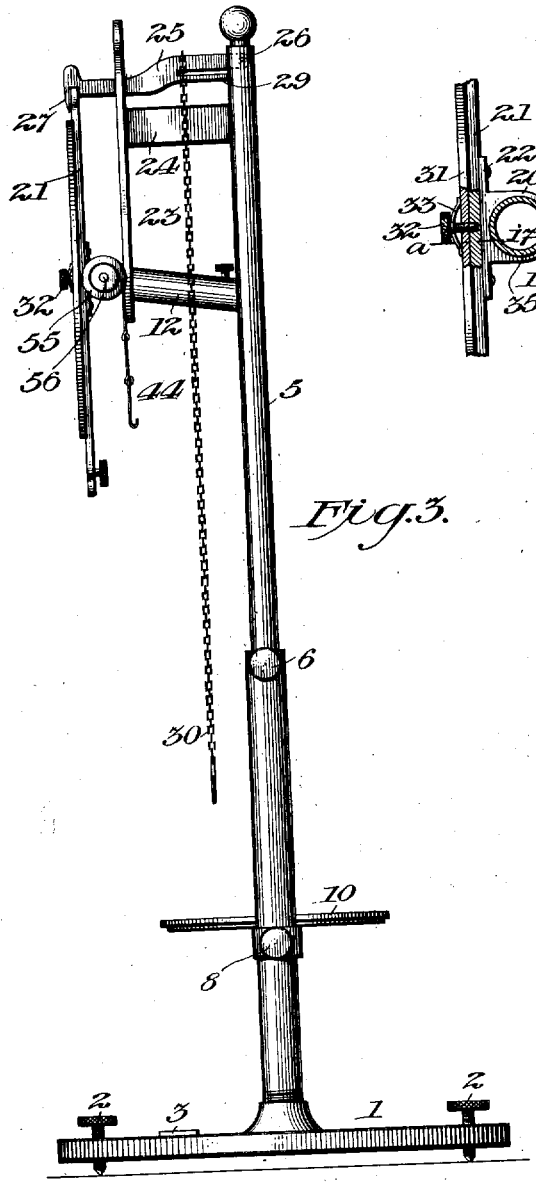
Figure 4:
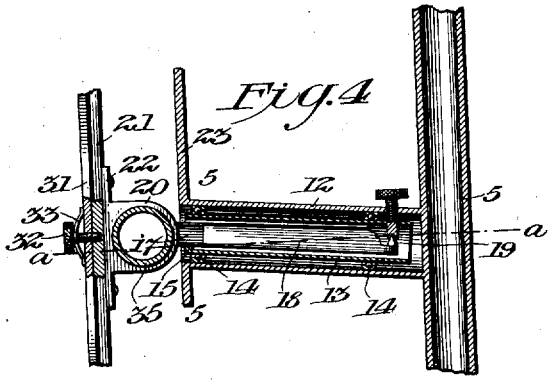
Figure 5:
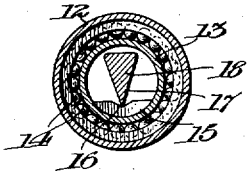
Figure 10:
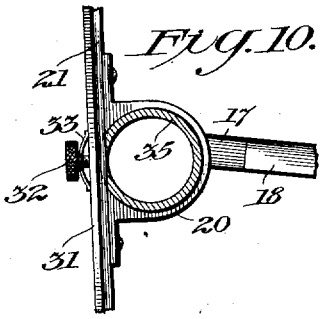
Figure 6:
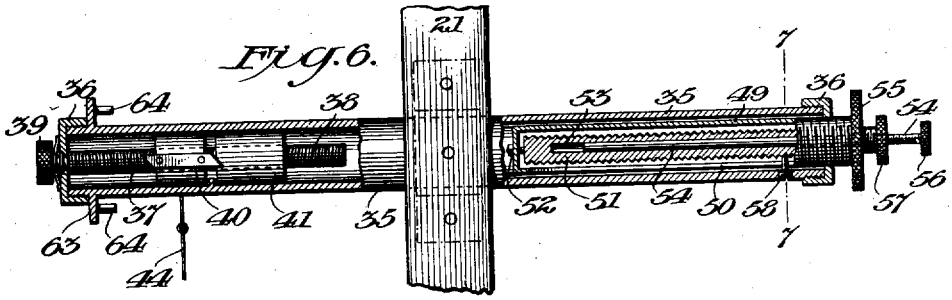
Figure 7:
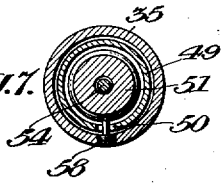
Figure 8:
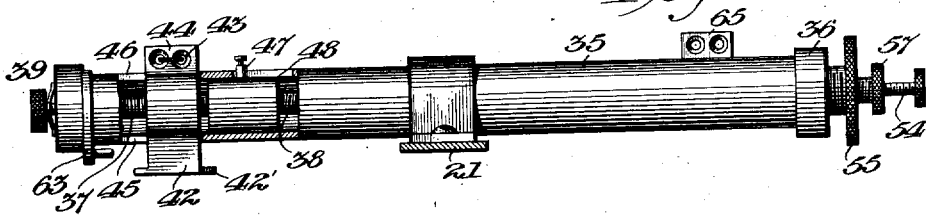
Figure 9:
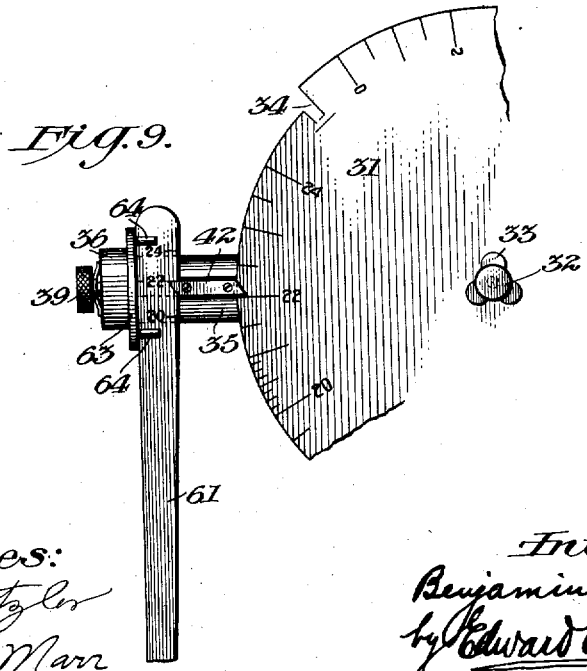

In these drawings Figure 1 is a front view of the balance. Fig. 2 is an enlarged detail view of the knife edge and pivot point suspension. Fig. 3 is a side view of the balance. Fig. 4 is an enlarged detail view of the parts in section, showing the suspension means in place. Fig. 5 is a sectional view on the line 5—5 of Fig. 4. Fig. 6 is an enlarged view of the beam with parts in section. Fig. 7 is a transverse section of the beam on the line 7—7 of Fig. 6. Fig. 8 is a plan view of the beam partly in section. Fig. 9 is an enlarged detail view, showing two methods of taking readings. Fig. 10 is a detail of the mountings.

I will first describe the apparatus herein illustrated, and then state its method of operation, pointing out the features which I consider to be novel and original with me.

Referring to Figs. 1 and 3, the circular base 1 carries a tubular standard 4, in which slides the extension tube 5 upon which the operating parts of the balance are carried. The tube 5 can be set in any desired position by means of the thumb screw 6, and true vertical adjustment is secured by means of leveling screws 2—2—2 in the base, operating according to the indications of the spirit level 3 which may be of the type commonly employed with balances.

In determining specific gravity it is necessary at one step in the operation to immerse the article in water, and therefore I provide a support for a containing vessel 11, comprising a disk 10 secured by a bracket 9 to the collar 7 adjustable on the standard 4 and locked in position by means of the set screw 8.

Referring particularly to Figs. 3 and 4, the tube 5 carries near its upper end an oblique forwardly extending branch tube or cylinder 12, rigidly secured to the tube 5 as by brazing, and carrying an upwardly extending plate 23, additionally secured to the tube 5 by means of the brace 24 so as to render it perfectly rigid. The scale-beam shown detached in Figs. 6 and 7 oscillates in front of this plate 23, and carries a vertical strip 21 as well as the disk 31. The function of the strip 21 is to enable the scale-beam to be steadied at certain points in its manipulations as will hereinafter appear. For this purpose the strip has a V-shaped notch in its upper end as best shown in Fig. 1, overlying which is the outer end 27 of an arm 25 pivoted at 26 to the upper end of the extension standard 5. The outer end 27 of this arm, as shown in Fig. 1, serves as a pointer, and to prevent lateral displacement, the arm plays vertically in a slot 28 in the plate 23. The arm is normally retracted or held in its uppermost position by the spring 29 shown integral with the body of the arm, and is pulled down to engage the notch in the plate 21 by means of a chain 30. The pointer 27 coöperates with graduations on the upper part of the plate 21, and since this plate is carried on the scale-beam and oscillates with it, the zero point is conveniently determinable by the relative positions of the scale and pointer. When the pointer coincides with the zero mark on the scale, there is a balance.

The disk 31 is pivoted at a point on the strip 21 which lies opposite the axis of the scale-beam. The edge of the disk is formed on an involute curve, and is graduated in the form now being described to read up to twenty-four divisions or steps of its rotation, and in fractions thereof. It is secured to the strip 21 by the screw 32 acting against a three-pointed spring washer 33. A slot 34 is cut in the periphery of the disk between the last graduation and the zero point for a purpose which will be explained presently.

As best shown in Figs. 6, 7 and 8, the beam or balance proper comprises an outer cylinder 35 threaded to receive end caps 36, to one of which is secured the adjusting screw 37, and in the other the threaded compound weight 50—51—54. The cylinder or tube 35 is carried in a collar 20 riveted to the plate 21 by the ears 22. The suspension means consisting essentially of the bar 18 working in the branch tube 12, is secured rigidly to the collar 20. In order to secure a very delicate suspension with perfect freedom of motion, a tube 13 is journaled in ball bearings 14 within the branch tube 12 (see Figs. 4 and 5), and this inner tube carries at its outer end a support 15 for the knife edge 17 on the bar 18 and at its inner end an adjustable bearing screw with a bearing seat in its tip to receive the point of the cone 19 on the end of the bar 18. The horizontal axis of suspension *a—a* of the scale beam thus passes through the knife edge 17 at its point of support 16, and through the pivot point 19.

Disposed on the left and right hand portions 37 and 38 of the screw shaft are the movable weights 40 and 41. The weight 40 is provided with opposite laterally extending portions 42 and 43, the former constituting an indicating member or pointer, and the latter providing a knife-edge bearing for a suspending chain 44. As shown in Fig. 8, this knife edge bearing is formed by reaming out two holes in the portion 43, in such a manner that the outer reamed portions of the holes overlap, thereby providing a piece of metal having a comparatively small angle between the two holes, which constitutes the knife edge. The extensions 42 and 43 are arranged to pass through slots 45 and 46 respectively, on opposite sides of the cylinder 35. The weight 41 is provided with a laterally extending pin 47, which extends through a slot 48 in the cylinder 35. Both of the weights 40 and 41 are threaded internally, so that when the thumb screw 39 is turned, these weights are forced apart or brought together by the action of the screw, in the meanwhile being prevented from turning with the screw by means of the lateral extensions which pass through the slots in the beam as heretofore explained. The object of this arrangement is to provide means for shifting the position of the article to be balanced by means of moving parts without dusturbing the balance in any way by the movement of said parts. To this end the weight 40, together with its lateral extensions and the member 44, is exactly equal in weight to the member 41. The opposite end of the beam is provided with an internal cylinder 49, and has a longitudinal slot 50 on its under side. Within the cylinder 49 is a threaded rod 51. The latter is pivotally secured at one end to the cylinder 49, by means of the pivot screw 52, as clearly shown in Fig. 6. While I have designated this member as a rod, it will be understood that a threaded cylinder might be used in lieu thereof. The rod 51 is provided with a central slot 53 arranged to receive a smaller rod 54. The cylinder 49 and the rod 54 are each provided with indicating scales on their outer surfaces, the former being graduated preferably in pennyweights and the latter in grains, although obviously the indicating characters may be so spaced as to represent other weights than these mentioned. The rods 51 and 54 are provided with milled end flanges 55 and 56, respectively. The rod 54 is arranged to pass through a hollow screw 57, which is arranged to extend into one end of the rod 51, and which can be screwed into or out of a slot in said rod for purposes of accurate adjustment of the balance beam.

Toward the outer end of the cylinder 35 is a screw 58, which has a threaded bearing in the cylinder 35 and passes through the slot 50 in the cylinder 49. The inner end of the screw engages the threads of the rod 51, as shown in Figs. 6 and 7.

The above described arrangement of the right hand end of the beam provides a novel means for extending the telescopic sections. It will be seen that by the revolution of the thumb flange 55, which is integral with the rod 51, as before stated, the latter will be turned, and since the screw 58 is stationary, the rod 51 and the cylinder 49, through its pivotal connection with the rod, will be forced outwardly, but while the rod is being rotated, the cylinder, which has upon it the indicating scale, will not be rotated, but will be forced outwardly by the rod as the flange 55 is turned. By this arrangement I secure a positive and accurate movement of the telescoping members while at the same time the indicating scale is always in view.

Operation: The operation of the mechanism thus described can now be explained, and will enable me to present clearly the novel points involved in my method. Let us assume that the operator, who may be a jeweler, seeks to determine the fineness of the metal in a ring. The balance is first adjusted with no weight on the suspension member 44, by turning the screw 57 until the pointer 27 is brought to the zero mark on the scale. The ring is then attached to the chain 44, by means such as a fine thread, the parts of the balance being in the position shown in Fig. 1. Thereupon the left hand side of the beam is deflected downwardly by the weight of the ring, and to restore the balance the thumb flange 55 is turned until the inner cylinder is extended far enough outwardly to balance by its weight. During this operation the chain 30 is pulled down while attaching the article or adjusting the balancing weights, so that the arm 25 engages the triangular slot 60 at the top of the strip 21, steadying the balance and preventing lateral movement. To try for a balance between adjustments, the chain is released, when the arm is returned to its original position by the spring 29. The primary or initial balance now having been obtained, with the article suspended in air, a vessel of water 11 is placed on the stand 10 and the article immersed therein. This will immediately result in destroying the balance, due to the displacement of a certain amount of water, so that the pull exerted on the chain is lessened proportionately. The counterbalance weights 50, 51, 54 are left as they were initially adjusted, and the balance is restored by turning the thumb piece 39 and thereby rotating the right and left hand screws 37—38. The weight 40 and the article are thereby moved outwardly, from the center of balance *a—a*, toward the left hand end of the beam, while the counterweight 41 is simultaneously moved inwardly, so that the resultant effect of the two weights 40 and 41 on the balance is zero. The movement of the article support and the article however results in increasing the pull on the left hand end of the beam until the pointer 27 again indicates zero on the scale, and a secondary balance is thus obtained. It will be observed that at this point two measurements have been obtained, the first denoting the ratio between the weight of the article in air as referred to a determinate standard, and the second denoting the proportionate loss in weight in water, as referred to the first measurement. Thus two ratios are determined, and at the same time a third ratio or resultant of these two ratios, which may be measured in terms of desired units of distance between the article-suspension in its final position and the center of balance.

It is understood of course, that the machine is calibrated so that the primary or initial balance will be accurate when the weights 40 and 41 are in a determinate position, as shown in Figs. 6 and 8, the proper measurement of values depending upon the subsequent movement out of this position. The greater the accuracy in initial adjustment therefore, the smaller the subsequent error.

In order to measure the degree of movement of the article, and thereby determine the aforesaid ratio of ratios, the disk 31 is turned in the direction of the arrow until its edge touches the extension 42. The graduations on the disk are so positioned that for each point of contact the indicating member 42′ will coincide with a graduation corresponding to the degree of fineness (or the specific gravity) required to balance at the point indicated. The figures associated with the graduations, when used in the jewelers' art, represent carats, as shown in the drawings. They may of course be varied with the nature of the materials and the consequent variation in character of the graduations. It may be noted that in Fig. 9 the pointer and the disk show the article under test to be twenty-two carats fine.

It is thought the theory upon which my method is based and the apparatus therefor designed, will now be sufficiently apparent. If the weight of the article be indicated by W, the distance of its line of suspension from the center of balance be indicated by P, and X represents turning moment on the opposite side necessary for a balance, then $X=WP$. When the article is balanced in water as already stated the article must be moved out so that $X=W\ (P+p)$. But, since X is the initial variable, and P is a constant, the value desired may be obtained directly by determining the value of $p$, that is to say the extent of movement by the article required to obtain a secondary balance.

The graduations on the disk are easily made by calibrating the scale with alloys of known composition. Having a given starting point for the extension 42, against which the disk normally rests, and a movement $p$ to balance a given weight, it will be clear that multiples of this movement can readily be determined and marked.

In Fig. 9 I have shown an additional means by which the fineness of the metal can be read directly and which can be used as a check on the reading indicated by the disk. This is a graduated scale 61, which may be placed between a guide member 63, having guide pins 64, and the extension 42. This scale 61 has a straight side and an inclined side, and is provided with graduations representing carats. As the extension 42 nears the guide member 63, less space is left for the scale 61, so that by slipping the scale down and letting it rest when it comes in contact with the extension 42, the indicating member 42′ will indicate approximately the value of the metal in carats.

As already stated the method and apparatus described can be used for determination of specific gravity, and readings taken in standard units, by calibrating with two or more substances of known specific gravity, balancing them in air and in water, marking on the disk their appropriate numbers, and further sub-dividing the disk in accordance therewith.

In Fig. 10 I have shown a modified means for mounting the upright strip 21. In this figure the beam is shown cut away so as to bring the face of the strip 21 in the same plane with the edge of the beam 35, thereby providing bearing points for the disk and preventing the lateral movement of the same on its pivot. This balance can be converted at once into an ordinary jeweler's balance by attaching a chain to the knife edge of the lateral extension 65 of the cylinder 35 and suspending pans thereto. By means of the scales on the cylinder 49 and rod 54, the balance may be used as indicating scales without the necessity of the use of separate weights.

I am aware that various modifications of the device, based upon the same general idea, might be made, but I regard as my own and wish to claim all such modifications as fairly fall within the spirit and the scope of the invention.

Having thus described my invention what I claim and desire to secure by Letters Patent is—

1. In a balance for determining the purity of alloys, a beam, means for supporting a mass of the alloy adapted to be shifted relatively to the fulcrum, an adjustable weight at the end of the beam, means for balancing the alloy in air and for restoring the balance obtained in air after immersion of the alloy in water, an adjustable scale movable with the alloy support, said scale calibrated according to degrees of purity of the alloy, and an index coöperating with the scale mounted on the alloy support and adapted to be brought into register with proportional marks thereon corresponding to percentages of purity of the alloy.

2. A balance for determining proportional adulteration of materials, comprising a balance beam, adjustable weights on each arm thereof, one of the weights being provided with a suspension device for the material, a proportional scale movable with the suspension calibrated according to degrees of purity, and a marker coöperating with the scale adapted to be brought into register with any of its indications by incremental adjustment to show the percentage of purity.

3. In a balance, a beam, a fulcrum or balancing center therefor, means carried on one end of the beam for supporting an article and adapted to be shifted with respect to the fulcrum to determine the net weight of the article, means for applying an initial counterbalancing force to the opposite end of the beam, and means for supporting a vessel containing a fluid of standard density so as to immerse the article and permit movement thereof while supported on the beam, and an adjustable scale coöperating therewith calibrated to register degrees of purity for indicating the extent of adjustment of the article and thereby the degree of fineness of its component elements.

4. In a balance, a beam, a fulcrum or balancing center therefor, means carried on one end of the beam for supporting an article and adapted to be shifted with respect to the fulcrum to indicate the net weight of the article, means for applying an initial counterbalancing force to the opposite end of the beam, and means for immersing the article in a fluid of greater density than air so as to permit movement thereof while supported on the beam, together with indicating means graduated to read in units of fineness or purity, and adapted to measure the degree of adjustment of the article in ratio of purity.

5. In a balance, a beam, a fulcrum or balancing center therefor, means carried on one end of the beam for supporting an article and adapted to be shifted with respect to the fulcrum to indicate the net weight of the article, means for applying an initial counterbalancing force to the opposite end of the beam, and means for immersing the article in a fluid of greater density than air so as to permit movement thereof while supported on the beam, together with an indicating device movable in proportion to and regulated by the movement of the article support, said device being calibrated in ratios of purity to indicate directly by specific gravity ratios the purity of the compound weighed.

6. In a balance, a beam, a fulcrum or balancing center therefor, means carried on one end of the beam for supporting an article and adapted to be shifted with respect to the fulcrum to indicate the net weight of the article, means for applying an initial counterbalancing force to the opposite end of the beam, and means for immersing the article in a fluid of greater density than air so as to permit movement thereof while supported on the beam, together with an index member on the article support and a scale coöperating therewith graduated in units of specific gravity or fineness of the material weighed, having relative movement proportionate to and determined by the movement of the article support in its final adjustment.

7. A balance comprising the following instrumentalities: a pivotal support, a beam carried thereon, a movable self-compensating article support or hanger on said beam, means for applying a suitable counterbalancing force to said beam, a vessel adapted to contain a fluid of greater density than air, means for supporting said vessel so as to immerse the article in said fluid while supported on the beam, and a movable indicator governed as to the degree of its movement by the movement of the article support on the beam, said indicator adapted to indicate degrees of fineness of the material weighed.

8. A balance comprising the following instrumentalities: a supporting column, a scale beam pivoted thereon, counterbalancing means adjustable with respect to one arm of said beam, a movable self-compensating article support on the other arm, a liquid container vertically adjustable on the column, and a scale and index for indicating the degree of movement of the article support, said scale being proportionally adjustable relatively to the index and calibrated to indicate ratio purity of the material weighed.

9. A balance comprising the following instrumentalities: means including a counterbalance weight for weighing an article in air, means for supporting a vessel containing fluid of known density so as to receive and surround the article in immersion, means for adjusting the article with respect to the counterbalance so that its net weight while immersed will restore the balance, and an indicator governed in said adjustment of the article to measure the amount thereof, and graduated in terms of specific gravity or fineness referred to the said fluid.

10. In a balance, a hollow pivoted beam, suspending and compensating means located therein and slidable therealong, a screw shaft within said beam for simultaneously moving said suspending means and said compensating means, and movable means adapted to engage the suspending means for indicating the extent of movement of the latter.

11. In a balance, a hollow pivoted beam, a screw shaft carried by said beam provided with right handed and left handed threads, a suspending member carried in said hollow beam arranged to be actuated by said right handed threads, a compensating weight arranged to be actuated by said left handed threads, and a rotatable disk arranged to engage the suspending means in its shifted position for indicating the extent of movement of said suspending means.

12. In a balance, a hollow pivoted beam, movable compensating means disposed within said pivoted beam, telescoping members secured in one end of said beam, one of said members being provided with a thumb flange and means for moving said telescoping members simultaneously by the rotation of said thumb flange.

13. In a balance, a hollow pivoted beam, a cylinder arranged to enter one end of said hollow beam, a threaded rod within said cylinder and connected with the latter at one end and having a thumb flange, means arranged to engage said rod to cause a progressive movement of the rod and cylinder when the thumb flange is turned.

14. In a balance, a hollow pivoted beam, a slotted cylinder adapted to slide in and out of said beam, a threaded rod disposed in said cylinder and pivotally connected with the latter at one end, and a screw arranged to pass through the slot of said cylinder to engage the threads of said rod, whereby when the latter is rotated the cylinder will be moved outwardly without rotation.

15. In a balance, a base, an upright therefor, an inclined cylinder secured to said upright, and a balance beam disposed within said cylinder and provided with a knife edge, and a pivot point for retaining said knife edge in position.

16. In a balance, a base, an upright therefor, an inclined cylinder secured to said upright, and a balance beam having a lateral extension provided on the under side thereof with a knife edge and on the upper side with a pivot point, and arranged to enter and be supported within said inclined cylinder.

17. In a balance, a base, an upright therefor, an inclined cylinder secured to said upright, a second cylinder secured within said inclined cylinder, ball bearings therefor, and a balance beam having a lateral extension provided on the under side thereof with a knife edge and on the upper side with a pivot point, and arranged to enter and be supported by said ball bearing cylinder.

18. In a balance, a pivoted beam provided with suspending and compensating members on one end thereof and movable therealong, means including a thumb wheel on the end of said beam, for simultaneously moving said compensating and said suspending means, telescoping members on the other end of said beam, a thumb wheel on one of said telescoping members for providing an outward non-rotary movement of the other of said members, and an indicating disk arranged to be rotated into engagement with said suspending means in its adjusted position.

19. In a balance, a pivoted beam, a disk carried thereby, suspending and compensating means disposed on said beam, and movable therealong, means including a thumb wheel on the end of said beam for simultaneously moving said suspending and said compensating means, and means on the surface of the disk for indicating the relative movement of the suspending means.

20. In a balance, a pivoted beam, a movable suspending member carried by said beam, and a disk having a periphery in the form of an involute curve arranged to contact with the suspending member in its original position and to be turned to contact with it in its shifted position, thereby indicating the relative movement of the suspending member.

21. In a balance, a pivoted beam provided with suspending and compensating members on one end thereof, and counter-weights on the other end, said parts providing means for balancing a suspended object, a pivoted disk, means for moving the suspending member toward and away from the edge of the disk, said disk being provided with a scale on the disk for denoting the relative movement of the suspending member.

In witness whereof, I have signed my name hereto, at Washington, D. C., this 11th day of December, 1911, in the presence of two subscribing witnesses.

BENJAMIN RUSH JOLLY.

Witnesses:
H. F. LOWENSTEIN,
C. S. GRUMMAN.

Copies of this patent may be obtained for five cents each, by addressing the "Commissioner of Patents, Washington, D. C."